(12) United States Patent
Heinl (10) Patent No.: US 7,955,064 B2
(45) Date of Patent: Jun. 7, 2011

(54) DEVICE FOR PRODUCING MOLDED PARTS FROM FIBER MATERIAL

(75) Inventor: Manfred Heinl, Raunheim (DE)

(73) Assignee: Robert Burkle GmbH, Freudenstadt (DE)

( * ) Notice: Subject to any disclaimer, the term of this patent is extended or adjusted under 35 U.S.C. 154(b) by 0 days.

(21) Appl. No.: 12/779,388

(22) Filed: May 13, 2010

(65) Prior Publication Data

US 2010/0279059 A1    Nov. 4, 2010

Related U.S. Application Data

(63) Continuation of application No. PCT/EP2008/009459, filed on Nov. 10, 2008.

(51) Int. Cl.
*B29C 70/30* (2006.01)

(52) U.S. Cl. ........ 425/80.1; 264/121; 425/145; 425/394

(58) Field of Classification Search .................. 425/80.1, 425/145, 149, 394; 264/121
See application file for complete search history.

(56) References Cited

U.S. PATENT DOCUMENTS

| | | | | |
|---|---|---|---|---|
| 5,679,296 A * | 10/1997 | Kelman et al. | ................. | 264/121 |
| 5,942,175 A * | 8/1999 | Curran et al. | ................. | 264/112 |
| 6,033,501 A * | 3/2000 | Yamaguchi et al. | .......... | 264/121 |
| 6,033,607 A * | 3/2000 | Kataoka et al. | .............. | 425/80.1 |
| 6,096,249 A * | 8/2000 | Yamaguchi | .................... | 264/121 |
| 7,622,062 B2 | 11/2009 | Forster | | |

FOREIGN PATENT DOCUMENTS

| | | |
|---|---|---|
| DE | 10324735 B3 | 11/2004 |
| EP | 0894885 A | 2/1999 |

* cited by examiner

*Primary Examiner* — James Mackey
(74) *Attorney, Agent, or Firm* — Volpe and Koenig, P.C.

(57) ABSTRACT

A device for creating a three-dimensional molded part (30) made from fiber material using of a multiple-part mold (1, 2) whose inside (1a, 2a) determines, at least partially, the contours of the molded part. The fibers are blown into the mold by an air flow using a plurality of nozzles (4) and the air flow then escapes through openings of the mold, so that the fibers accumulate on the inside of the mold, whereupon the fibers are optionally compressed locally before they are bonded with each other through the supply of heat and are finally taken from the mold (1, 2) as a molded part (30). The blowing direction of the nozzles (4, 24, 34) can be pivoted and the pivot axes extend close to the outside of the molded part and the fibers are blown in by the nozzles (4, 24, 34) that are activated at different times.

12 Claims, 8 Drawing Sheets

DEVICE FOR PRODUCING MOLDED PARTS FROM FIBER MATERIAL

CROSS-REFERENCE TO RELATED APPLICATIONS

This application is a continuation of PCT/EP2008/009459, filed Nov. 10, 2008, which claims the benefit of German Patent Application No. 10 2007 054 424.5, filed Nov. 13, 2007, both of which are incorporated herein by reference as if fully set forth.

BACKGROUND

The invention relates to a device for producing three-dimensional molded parts from fiber material using a multiple-part mold whose inside determines at least partially the contours of the molded part, wherein the fibers are blown into the mold by an air flow by at least one nozzle and the air then escapes through openings of the mold, so that the fibers accumulate on the inside of the mold, whereupon the fibers are optionally locally compressed before they are bonded with each other by the supply of heat and are finally taken from the mold as a molded part.

A device of this general type has become known through DE 103 24 735. In order to avoid repetition, the contents of this publication are also incorporated herein by reference as if fully set forth.

In addition, it is known through DE 2318501 in the production of hollow bodies from plastic fibers to produce a preform, wherein work is performed with a rotating, perforated mold. This mold is open on one end and is crossed there by a tube that blows both the fibers and also an adhesive into the interior of the mold. This tube is slowly drawn out from the mold during the rotation of the mold, so that the mold is loaded with fibers across its entire length.

This method is thus suitable only for hollow bodies that are open on one end, so that the blow-in tube can be arranged there. In addition, the movement of the blow-in tube is very limited, which makes the uniform filling of the mold more difficult. Further, the mold must rotate during the injection, which leads to additional production costs.

In contrast, it would be desirable to produce closed molded bodies and to be able to work with an essentially stationary, fixed mold.

SUMMARY

The present invention starts from the knowledge that it is problematic in DE 103 24 735 for certain molds to realize a homogeneous fiber distribution or else to produce molded-part regions with selectively different densities. Therefore, the objective of the present invention is to provide a device that allows individual control of the fiber distribution in the mold, even if the mold has very irregular three-dimensional contours. In addition, the invention distinguishes itself through an economical and reliable construction.

This objective is met according to the invention in that the blowing direction of the nozzle can be pivoted and the pivot axis runs close to the outside of the molded part and the fibers are blown in by several nozzles that are activated at different times.

This configuration produces the advantage that, like in DE 103 24 735, work can be performed with closed, stationary molds and closed, non-hollow molded bodies can be generated and the advantage that, however, due to the greatly variable blowing direction, a much more selective filling of the mold is also possible to the sides of the nozzle and for complicated contours, in particular, individual regions in the mold can be charged with more or less fibers. In this way, an individual control of the load density within the molded part can be achieved. In addition, the wall thickness of the molded part can also be influenced locally. Further, through activation of the injection process at different times, mutual interference can be ruled out.

It has proven to be favorable when the nozzles or at least their blowing direction perform a back-and-forth movement during the injection process with a frequency of at least 0.3 Hz. This movement that equals only a few centimeters or angular degrees and that can be performed preferably in the vertical direction, but likewise also in the horizontal or an intermediate direction, overlaps the pivoting motion described above and aids the filling process.

One especially preferred refinement of the invention provides that several nozzles are connected advantageously by valves, in particular, squeeze valves, to a common ring line. The nozzles are here arranged distributed across the periphery of the mold. In this way, the mold can be filled with a single blower via multiple nozzles from different positions. In addition, the ring line has the advantage that the fiber flow can be maintained continuously, because the mentioned advantages are used for the time sequential control of the filling process. An undesired accumulation of fibers in the supply line is therefore ruled out.

For the same purpose it can be useful to provide a closeable opening in front of or on the nozzles, wherein the line and optionally the adjacent nozzle region can be blown free through this opening.

In addition, it has proven favorable when a measurement of the air pressure is performed while the fibers are being blown in and the filling process is ended when a certain limit pressure is reached. The pressure can here be measured at different points of the mold or close to the nozzles or in the region of the supply line. It is especially favorable to install a pressure sensor directly in the nozzles. In general, the air pressure increases with increasing fiber loading of the mold, because the flow resistance through the perforated mold increases as a function of the loading thickness. This gives a criterion with fine sensitivity, in order to detect the loading thickness of the mold and to end the filling process at the correct time.

The pivoting of the blowing direction should be selected so that the wall regions of the mold adjacent to the nozzle to the left and right or to the top and bottom can be charged. Preferably, the pivoting movement is performed with at least ¼ Hz, that is, the blowing direction reaches the output direction again at the latest after 4 seconds. Preferably, the work is performed with frequencies between ½ Hz to 5 Hz.

For the adjustment of the blowing direction, there are different options available to someone skilled in the art. First, the blowing direction can be changed such that the nozzle itself is pivoted. The pivoting movement can be realized about a fixed pivot axis, but the work can also be performed with a moveable pivot axis, in that the nozzle is guided along corresponding connecting-rod tracks.

Second, the blowing direction can also be influenced in that, in the discharge region of the nozzle, adjustable deflection vanes are arranged or that the nozzle has an adjustable nozzle projection that is driven by a reduction gear. In both cases, the nozzle can be mounted fixed on the mold. However, there is also the option to work, in addition to the adjustable mounting of the nozzle, with deflection vanes, in order to realize an especially strong deflection of the blowing direction through the combination of both measures.

Finally, there is also the option to influence the blowing direction in that work is performed with an additional deflection stream that comes from the side and therefore changes the original blowing direction. This deflection stream is preferably adjustable in its intensity and/or blowing direction, in order to be able to adapt it to the requirements of each form.

The adjustment of the nozzle and/or its deflection vane and/or the activation and optional adjustment of the deflection stream are preferably performed by a motor and a programmable controller. The programmable controller has the advantage that initially sample runs can be performed with different parameters until the molded part has the desired product properties. The fitting parameters are then stored in the programmable controller.

The mounting of the nozzle is realized preferably on the mold itself, in particular, on the upper mold that performed only a vertical stroke. However, it also lies in the scope of the invention to mount the nozzles separately, for example, on the press frame and they are to be moved onto a corresponding blow-in opening of the mold only during the filling process and they are optionally coupled there.

In order to adapt the filling process individually to locally different specifications with respect to fiber density, the mold can have adjustable flaps in its perforated region, wherein the local air discharge can be throttled to a greater or lesser degree by the use of these flaps. These flaps can then be used, in particular, when work is performed with temporary auxiliary molds.

Finally, it lies in the scope of the invention to insert at least one cover layer into at least one part of the mold before the bonding of the fibers, in particular, before their final compression or to place this cover layer on the already blown-in fibers. This cover layer could be used as a decorative film for improving the appearance, but could also have an additional function, for example, for forming a non-slip or wear-resistant layer, or only to impart a homogeneously smooth outer side to the molded part.

With respect to the method, it is especially favorable if the cover layer is already placed before the film is blown into the mold. In this way it can be suctioned and held on the lower and/or upper mold by a low pressure or can be fixed in the mold locally by clamp or snap connections, so that it does not slip while the fibers are subsequently being blown in.

In terms of material, almost anything can be selected for the mentioned cover layer. However, in principle it should involve a material with certain air permeability, so that the injection process and also the later flow with hot air is not negatively affected. In particular, woven, knitted, knotted, or non-woven fabric layers, also in the form of carpet-like mats and the like could be used. However, if the cover layers are to be inserted only after the fibers are blown into the mold, relatively thick cover layers could also be used.

BRIEF DESCRIPTION OF THE DRAWINGS

Additional features and advantages are given from the subsequent description of embodiments with reference to the drawing.

In the drawings.

DETAILED DESCRIPTION OF THE PREFERRED EMBODIMENTS

Figure 1:
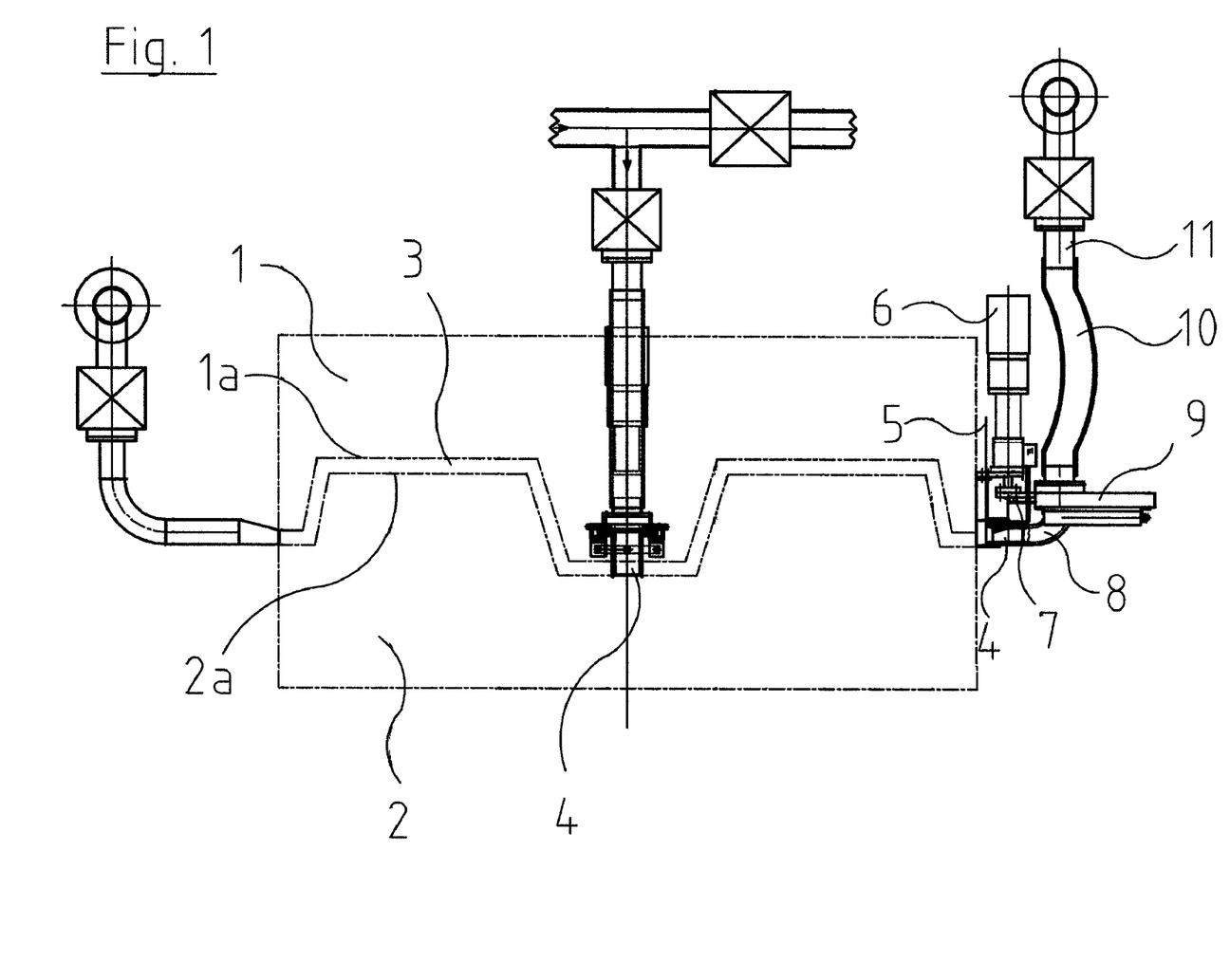
FIG. 1 is a side view schematic diagram of the mold with blow-in nozzles arranged on this mold.

In FIG. 1, a mold is shown with an upper mold 1 and a lower mold 2 that are moved together such that their insides 1a and 2a facing each other form a closed intermediate space 3. This intermediate space can already define the contours of the three-dimensional molded part to be produced, but it is preferable if upper mold 1 and lower mold 2 are first used for producing a preform and this preform is then compressed by a different upper mold to form the final molded part. The insides 1a and 2a of the mold are typically perforated like a sieve, so that the air flow loaded with plastic fibers and flowing into the intermediate space 3 at the side can escape from the intermediate space 3, while the fibers accumulate in the intermediate space. In this way, the air permeability of the inner walls 1a and 2a can be locally different, in order to be able to vary the fiber loading, that is, the fiber density within the intermediate space 3.

Now it is essential that at least a few of the nozzles 4 connected to the intermediate space 3 are mounted so that they can pivot such that their pivot axis 5 is positioned close to the outer edge of the molded part, as close as the mold wall.

Figure 2:
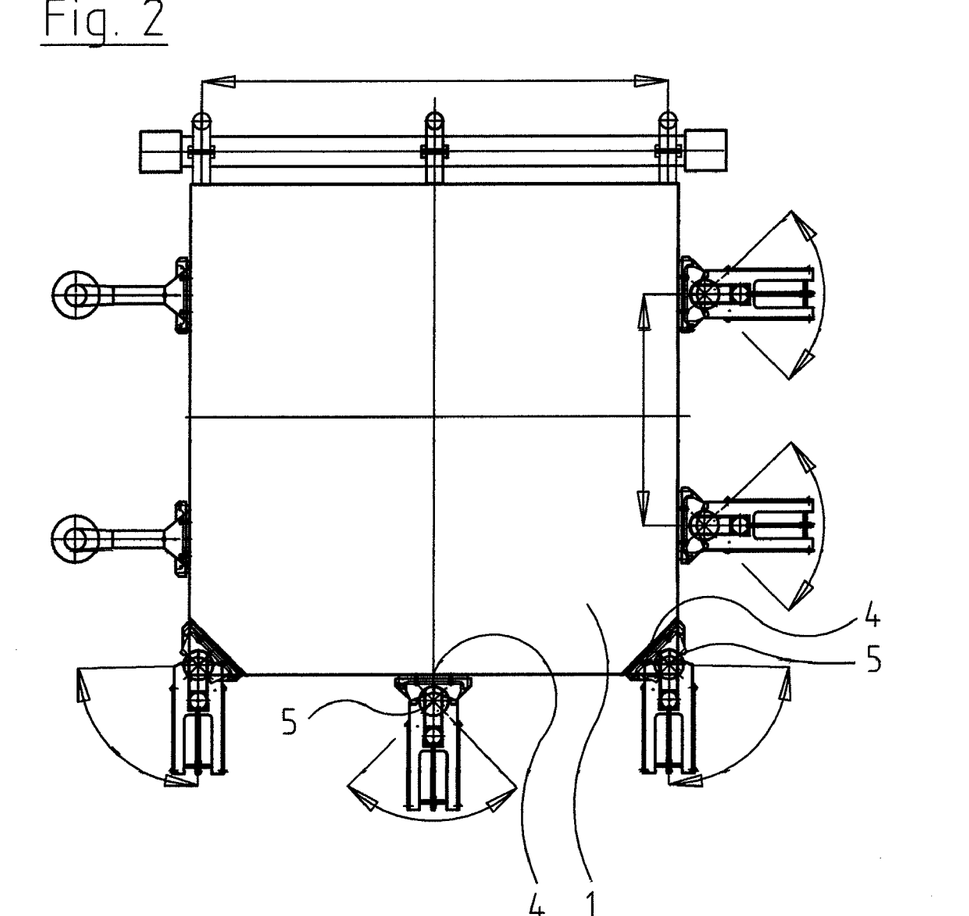
FIG. 2 is a top view of a similar mold.

In the embodiment shown, the molded part to be produced has a predominantly horizontal extent. Therefore, the pivot axes 5 for the nozzles extend vertically, so that the nozzles can be pivoted horizontally across the entire cross section of the molded part or sub-regions, as emerges primarily from FIG. 2. Instead of or in addition to this, pivoting about an approximately horizontal pivot axis—according to the dimensions of the molded part—is also useful.

Figure 3:
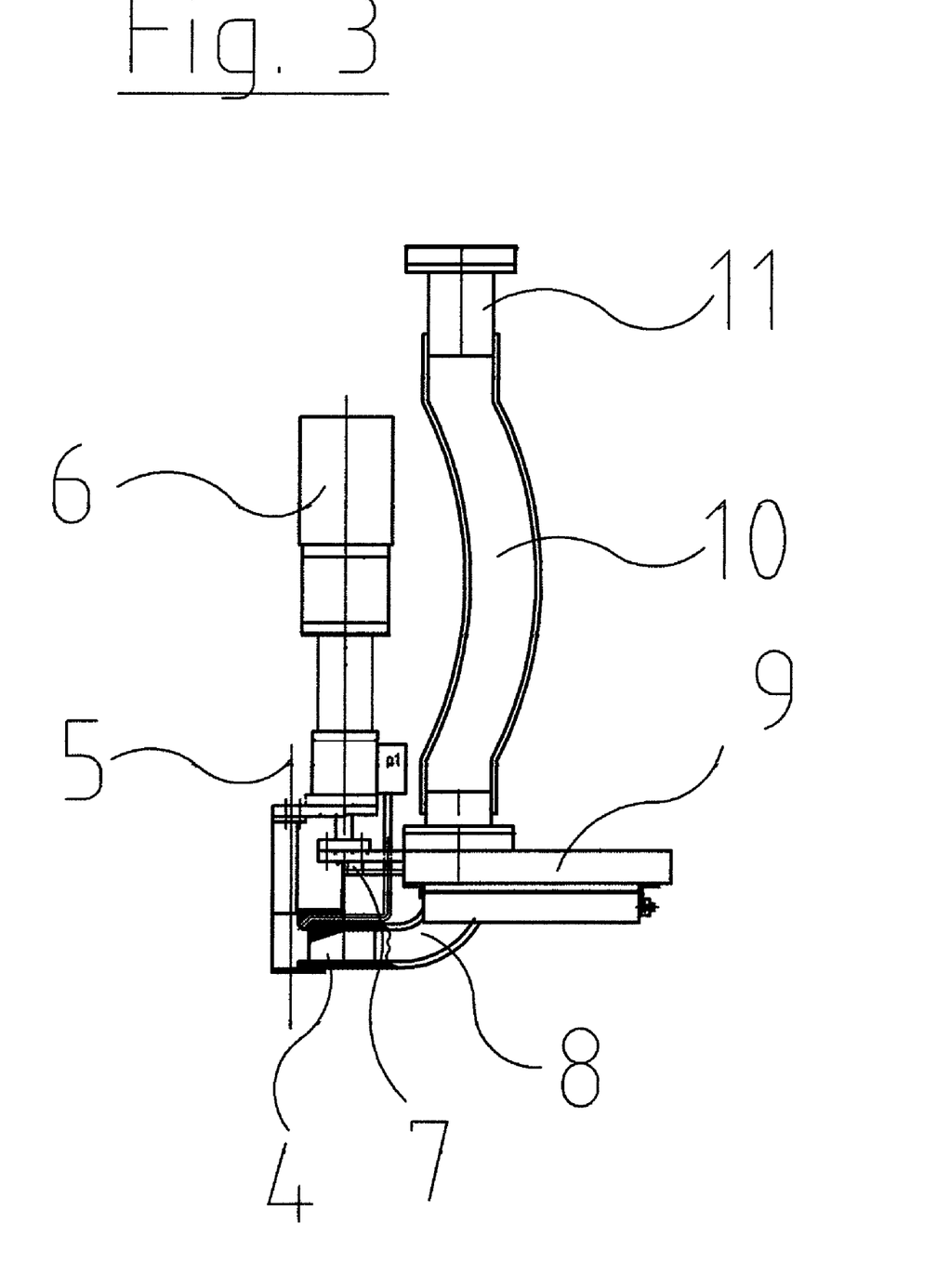
FIG. 3 is an enlarged diagram of a pivot nozzle with drive.

The pivoting mounting is shown in more detail in FIGS. 1 and 3. There one sees a pivot motor 6 that pivots, via pivot levers 7, the nozzles 4, together with their connection line 8 and a connection flange 9, back and forth about an imaginary vertical axis 5 almost aligned with the mold outer edge. The connection flange 9 is connected on its side by a flexible line 10 to a stationary connection 11 that is connected to a ring line not shown in detail. From this ring line, the nozzle 4 is charged from above across a 90° deflection with an air flow delivering the fiber material.

Figure 4:
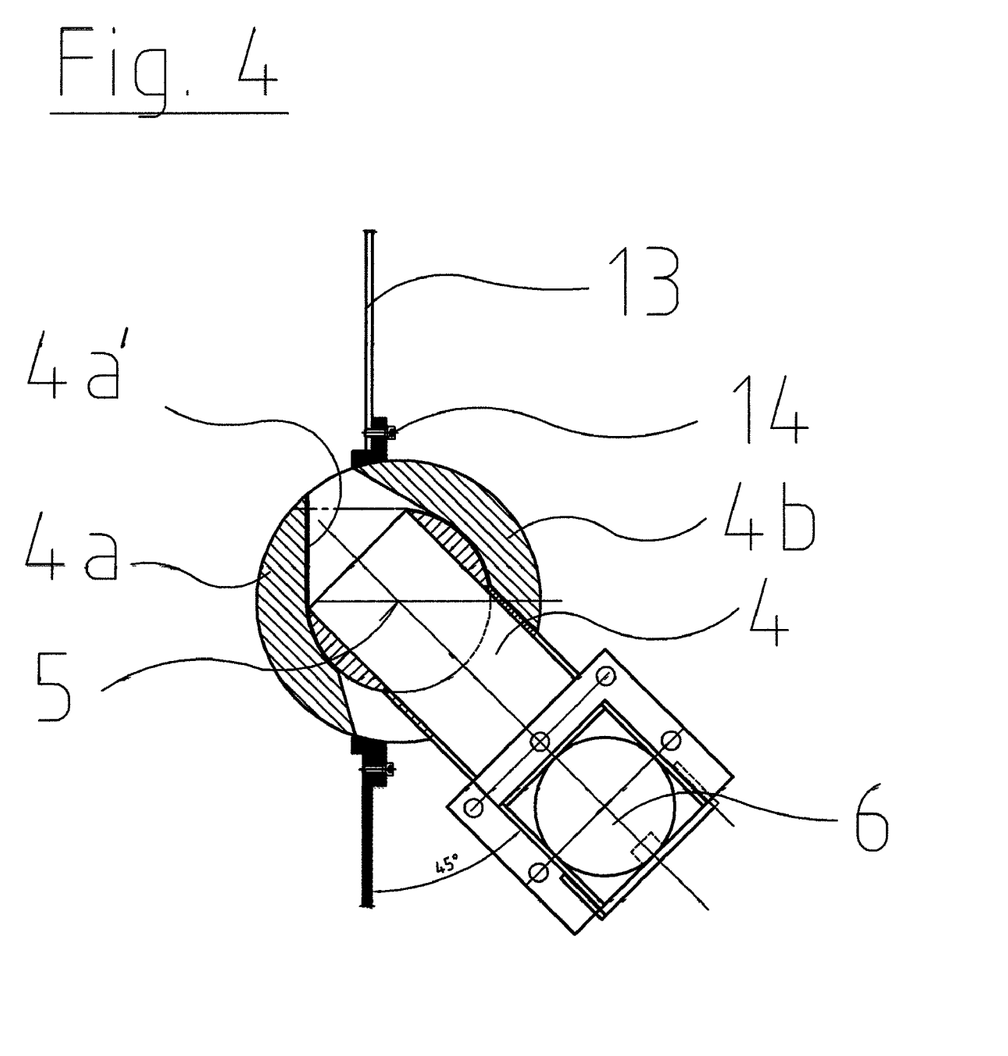
FIG. 4 is a view showing the mounting of the pivot nozzle on the mold wall.

FIG. 4 shows the pivot mounting on the mold outer wall that defines the intermediate space 3 and that forms the upper frame-like edge of the lower mold 2, wherein the lower mold preferably remains at rest, while the upper mold can move vertically. Here a bearing bushing 14 can be seen in which a nozzle projection formed with 2 deflection cheeks 4a and 4b that can pivot into the mold and, indeed, as executed in the preceding figures, about a vertical axis that is aligned approximately with the mold outer wall 13.

In the interior of the nozzle projection 4a, the nozzle 4 is mounted so that it can pivot on its side and, indeed, likewise about a vertical axis.

The nozzle 4 and its projection 4a are coupled with each other by a reduction gear such that a pivoting of the nozzle 4 causes a stronger pivoting of the projection 4a. In FIG. 4, one can see that the nozzle 4 has been pivoted from the neutral position vertical to the mold wall by 45° to the side—in the drawing downward. Here, the reduction gear has provided that the deflection cheek 4a has been pivoted by 90° in the same pivoting direction, such that its previously pivoted inner wall 4a' runs within the mold nearly parallel to the mold wall 13, while the opposing, back-pivoted inner flank is pivoted only by ca. 30° and runs out, for example, onto the bearing bushing 14. In this way it is possible, by pivoting the nozzle by only 45°, to pivot the nozzle projection 4a so far that the outward flowing fiber material is blown into the mold nearly parallel to the wall 13.

The same applies analogously when the nozzle 4 is pivoted in the inverse direction by 45° from the neutral position; then the fiber material discharge is realized in the drawing approximately parallel to the lower mold wall.

As a result, a pivoting of the nozzle 4 by 90° leads to a considerably greater pivoting of the nozzle projection 4a. Obviously, the reduction ratio could even be amplified. As a rule, it is sufficient, however, when the inner wall 4a' pivoted forward extends approximately parallel to the outer wall of the mold.

Figure 5:
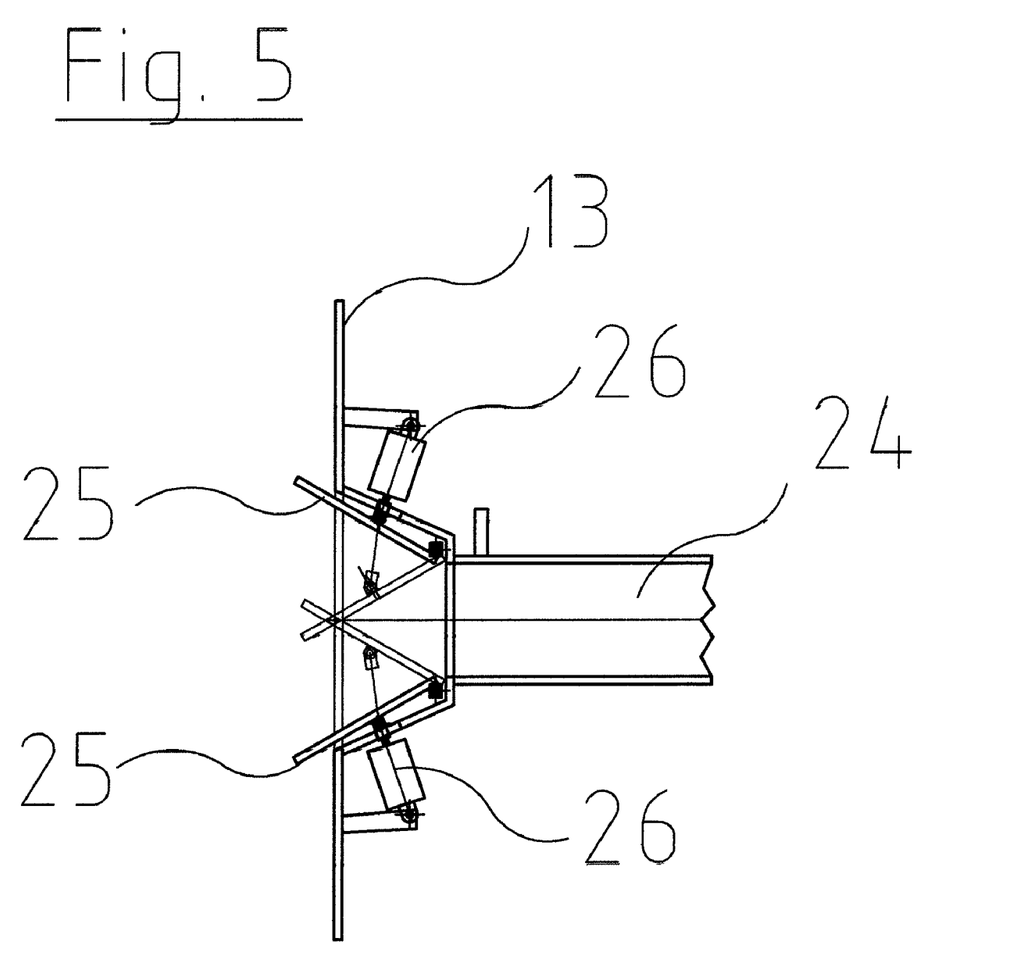
FIG. 5 is a view of a nozzle with pivoting deflection vanes.

FIG. 5 shows an alternative construction for the pivoting of the blow-out direction. In this case, the nozzle 24 can be mounted stationary on the mold wall 13, because individually controllable deflection vanes 25 are supported in the discharge cross section of the nozzle. They are adjusted by adjustment motors 26 into the desired angular position.

Figure 6:
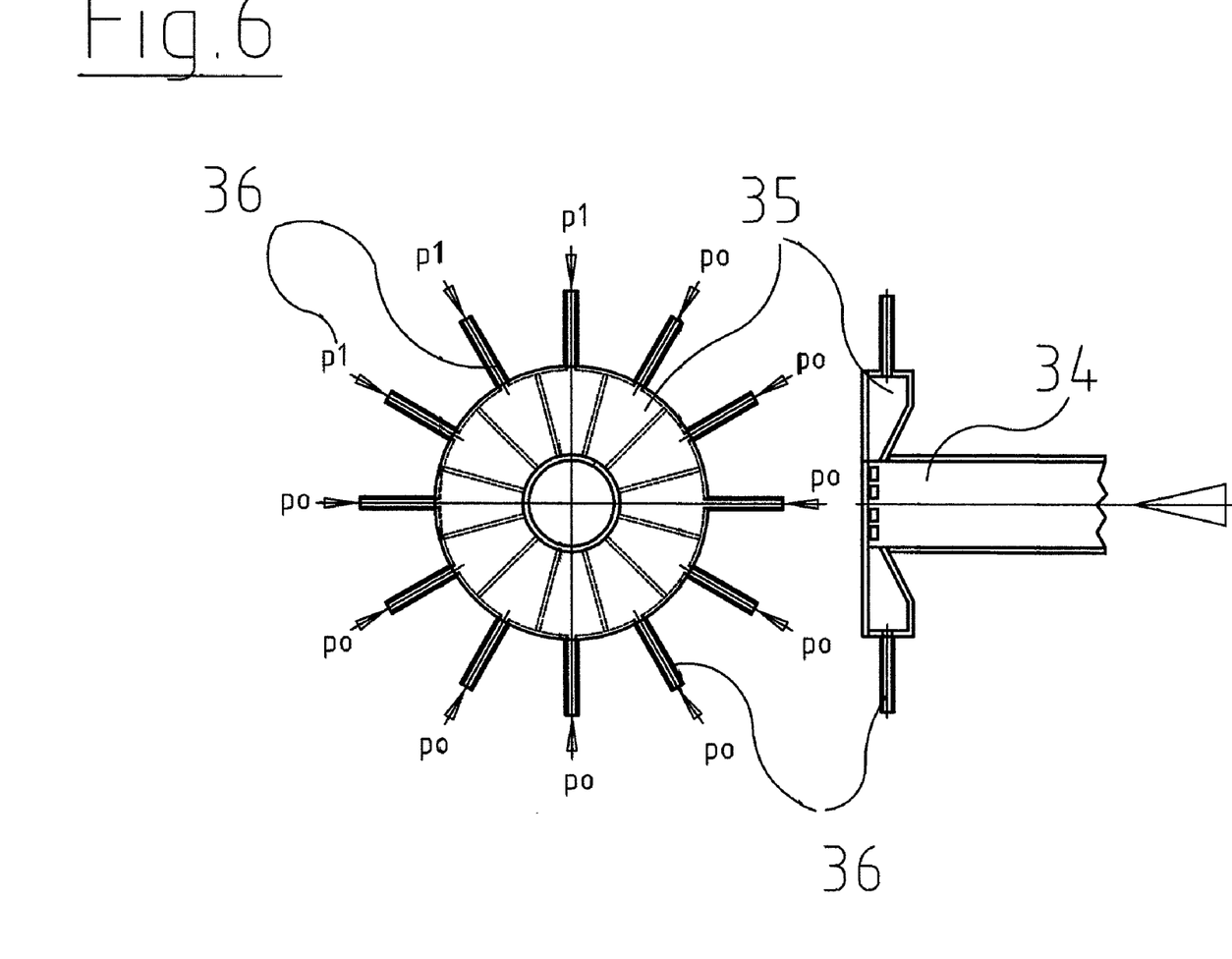
FIG. 6 is a view of a nozzle with deflection streams.

FIG. 6 shows a third alternative in which the nozzle 34 can likewise be mounted stationary on the mold wall 13. Here, the pivoting of the blowing direction is realized through a deflection flow supplied at the side. For this purpose, the nozzle is surrounded by a ring chamber 35 close too its discharge cross section and this ring chamber can be charged selectively across a part of its periphery with compressed air by a plurality of air supply lines 36 distributed across the periphery. This compressed air then deflects the air flow when passing the nozzle 34 selectively in a desired direction.

By switching the lines 36 charged with compressed air, the fibers can be controlled in a defined way in a new direction.

Figure 7:
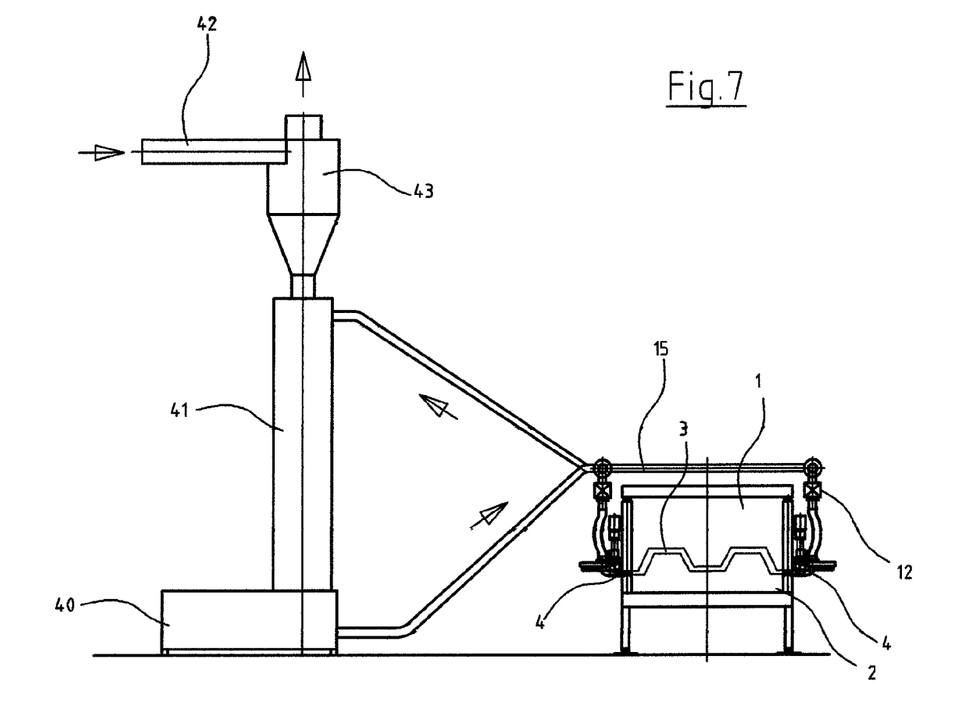
FIG. 7 is a side view of the system with ring line.
Figure 8:
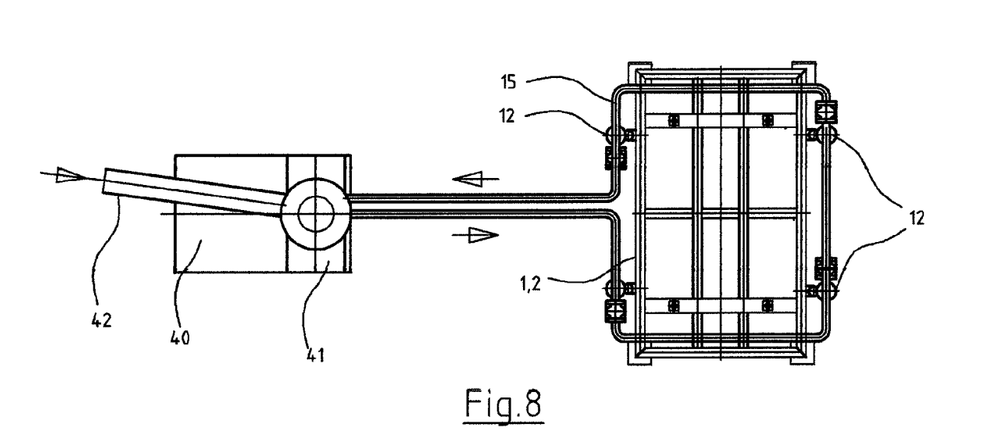
FIG. 8 is a top view of FIG. 7 from above.

FIGS. 7 and 8 show a total view of the system. One can see, first, on the right, the mold box made from the upper mold 1 and lower mold 2 with several nozzles 4 distributed on the periphery along the intermediate space 3. All of these nozzles are connected by pinch valves 12 to a common ring line 15. This ring line is arranged on its side on a blower 40 and is charged in this way with a fiber-loaded air flow. Above the blower 40, a storage chamber 41 is arranged on whose upper end, the return run of the ring line 15 opens. The fiber supply to the storage chamber 41 is realized in a known way on its top side by a line 42 that opens through an air separator 43 into the storage chamber 41.

The process sequence is as follows in all of the variants: first the intermediate space 3 is charged with fibers across the nozzles 4 distributed on the mold periphery until the desired filling degree and the desired distribution is achieved. The fibers are either coated with hot-sealable material or mixed with binding fibers.

If high density differences are desired in the molded part, it is recommended to work initially as known with at least one temporary auxiliary upper mold that generates locally a larger intermediate space; since it corresponds to the molded part, this auxiliary upper mold is to be removed after the filling process, especially by raising the upper mold 1 and then lowering a different upper mold whose inner wall 1a corresponds exactly to the contours of the desired molded part, wherein a local compression of the fibers is realized. Here, the temporary auxiliary upper mold, and also the final upper mold can have adjustable flaps, in order to throttle the air flowing out from the mold locally to a greater or lesser degree.

Then, in the compression station, but preferably after moving the upper mold and lower mold into a different station, hot air is led through the fiber material collected in the intermediate space 3, in order to bond or fuse the fibers with each other in a known way, so that finally the completed molded part is produced.

Before opening the mold and removing the molded part, in general, cooling air is passed through it, in order to generate the hardening of the molded part and to shorten the cycle time.

Figure 9:
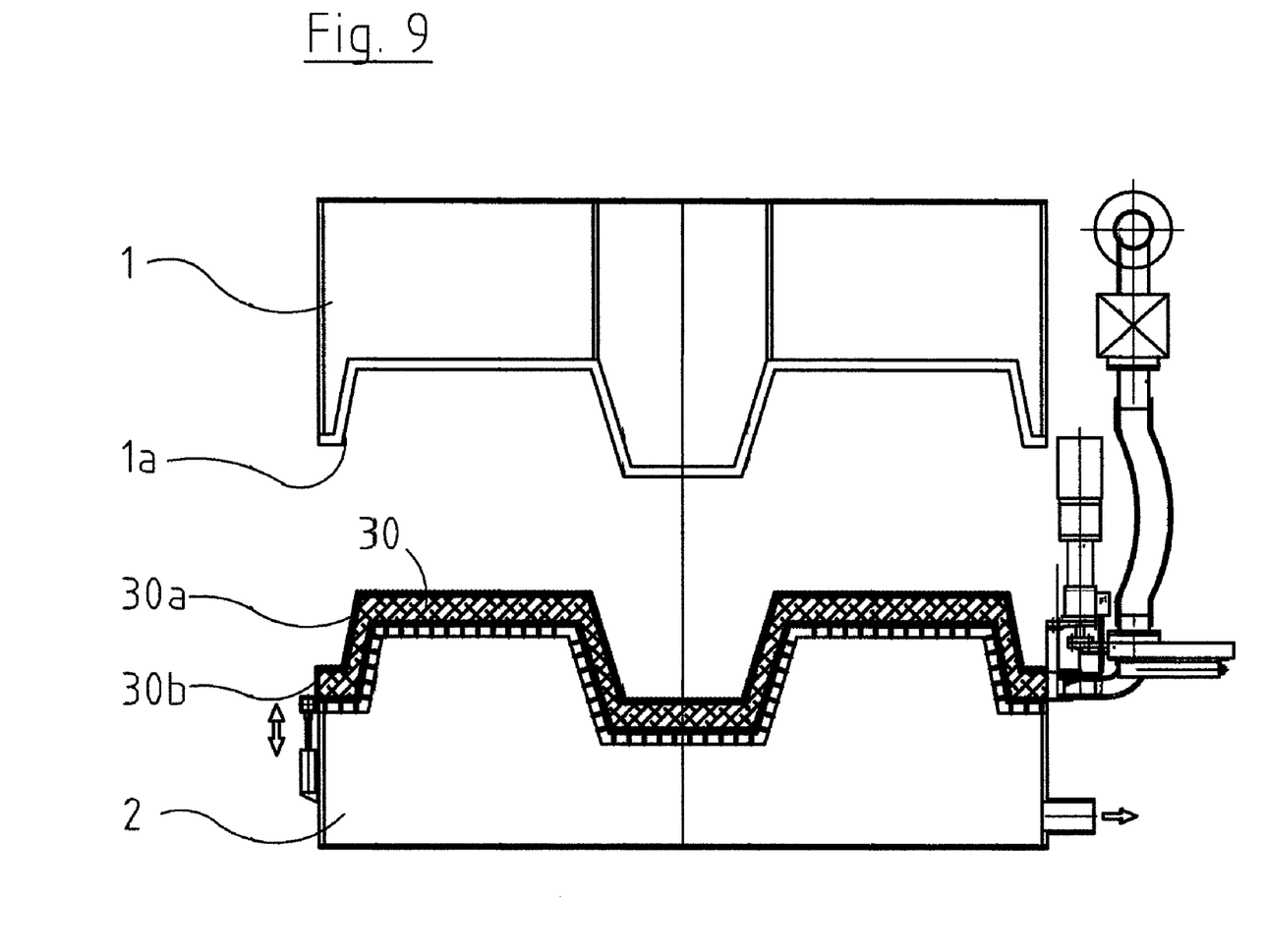
FIG. 9 is a side view of the opened mold for an alternative molded part.

FIG. 9 shows a side view of the opened mold for an alternative molded part. Here, a completed molded part 30 can be seen that is laminated on its bottom side and top side with a cover layer in the form of a decorative film 30a or 30b. This cover layer can be inserted before the fibers are blown into the mold and optionally fixed on this mold. However, if work is performed with temporary auxiliary molds, then it is recommended to first attach the cover layer when the final mold is used, that is, the final compression of the molded part takes place. For example, if work is performed with a temporary auxiliary upper mold, then the decorative film is first placed only in the lower molded part, the preliminary compression thus takes place with an upper cover layer, and the latter is inserted only when the final upper mold part is used.

As the cover layer, a material with high air permeability, in particular, a woven, knitted, knotted, or non-woven fabric is used, in order to minimize any negative affect to the flow through the molded part with heating air and cooling air.

The connection of the cover layer to the molded part can be realized through adhesion, but preferably through the same bonding agent with which the fibers are also connected to each other.

The invention claimed is:

1. Device for creating a three-dimensional molded part (30) made from fiber material, comprising a multiple-part mold (1, 2) having an inside (1a, 2a) that determines at least partially contours of the molded part, a plurality of nozzles (4) that are adapted to blow fibers into the mold using an air flow, and the air flow then escapes through openings of the mold, so that the fibers accumulate on the inside of the mold, and the fibers are adapted to be bonded with each other through a supply of heat and are taken from the mold (1, 2) after cooling as a molded part (30), the nozzles (4, 24, 34) are pivotable and pivot axes of the nozzles extend outside of the molded part and the fibers are adapted to be blown in by ones of the nozzles (4, 24, 34) that are activated at different times, and a programmable controller is adapted to pivot the nozzles (4, 24, 34) in a back-and-forth motion with a frequency of at least 0.3 Hz during an injection process.

2. Device according to claim 1, wherein the nozzles (4, 24, 34) are connected to a common ring line by valves.

3. Device according to claim 1, wherein a closeable opening for free blowing is arranged on or in front of the nozzle (4, 24, 34).

4. Device according to claim 1, further comprising an air pressure measurement device in a nozzle feed line connected to the nozzles, in at least one of the nozzles, or in the mold that is adapted to take an air pressure measurement as the fibers are being blown in, and the filling process is ended when a certain limit pressure is reached.

5. Device according to claim 4, wherein the air pressure measurement device is adapted to measure a back pressure.

6. Device according to claim 1, further comprising a nozzle projection (4a, 4b) that can be adjusted relative to the nozzle that allows an adjustment of the blowing direction.

7. Device according to claim 1, further comprising adjustable deflection vanes (25) arranged in an out-flow zone of the nozzle for adjustment of the blowing direction.

8. Device according to claim 1, further comprising air supply lines arranged on an outflow side of the nozzle for an additional deflection flow that comes from at least one side of the nozzle, and the deflection flow is adapted to be adjusted with respect to at least one of a volume or direction of the deflection flow.

9. Device according to claim 1, further comprising a motor connected to the programmable controller to adjust a direction of the nozzle (4) or a deflection vane (25) arranged in an out-flow zone of the nozzle for adjustment of the blowing direction using a program.

10. Device according to claim 1, wherein the nozzles (4, 24, 34) are supported on a part of the mold (1, 2).

11. Device according to claim 1, further comprising a temporary auxiliary upper mold that is adapted to perform a preliminary compression or final compression of the fibers.

12. Device according to claim 11, wherein the mold or the temporary auxiliary upper mold has adjustable flaps for controlling a local air discharge.

* * * * *